(12) United States Patent
Ujisato et al.

(10) Patent No.: US 7,848,628 B2
(45) Date of Patent: Dec. 7, 2010

(54) CAMERA SYSTEM, CAMERA CONTROL APPARATUS, PANORAMA IMAGE MAKING METHOD AND COMPUTER PROGRAM PRODUCT

(75) Inventors: Takanobu Ujisato, Tokyo (JP); Hideki Hama, Tokyo (JP); Hiromitsu Baba, Kanagawa (JP); Masaaki Kurebayashi, Shizuoka (JP)

(73) Assignee: Sony Corporation, Tokyo (JP)

( * ) Notice: Subject to any disclaimer, the term of this patent is extended or adjusted under 35 U.S.C. 154(b) by 875 days.

(21) Appl. No.: 11/563,095

(22) Filed: Nov. 24, 2006

(65) Prior Publication Data

US 2007/0189747 A1    Aug. 16, 2007

(30) Foreign Application Priority Data

Dec. 8, 2005    (JP)    ............................. 2005-355250

(51) Int. Cl.
*G03B 17/00*    (2006.01)
*G03B 13/00*    (2006.01)
*H04N 7/00*    (2006.01)
*H04N 5/232*    (2006.01)

(52) U.S. Cl. ........................ 396/72; 396/379; 348/36; 348/39; 348/240.99

(58) Field of Classification Search ................... 396/72, 396/85, 379; 348/36, 39, 240.99, 240.1, 348/240.2, 240.3, 347
See application file for complete search history.

(56) References Cited

U.S. PATENT DOCUMENTS

| | | | | |
|---|---|---|---|---|
| 5,262,867 A | * | 11/1993 | Kojima | ........................ 348/39 |
| 2005/0200706 A1 | * | 9/2005 | Ouchi | .................... 348/207.99 |

FOREIGN PATENT DOCUMENTS

| | | |
|---|---|---|
| JP | 11-18003 | 1/1999 |
| JP | 2000-101991 | 4/2000 |
| JP | 2004-310585 | 11/2004 |

* cited by examiner

*Primary Examiner*—Rochelle-Ann J Blackman
(74) *Attorney, Agent, or Firm*—Oblon, Spivak, McClelland, Maier & Neustadt, L.L.P.

(57) ABSTRACT

A camera system includes a camera apparatus for shooting an object to output an image signal and a camera control apparatus for controlling the camera apparatus such that the camera apparatus shoots a plurality of images constructing a panorama image in a predetermined order while changing zoom magnifications based on previously-determined setting and making a panorama image by joining a plurality of images with different zoom magnifications shot by the camera apparatus together.

11 Claims, 8 Drawing Sheets

CAMERA SYSTEM, CAMERA CONTROL APPARATUS, PANORAMA IMAGE MAKING METHOD AND COMPUTER PROGRAM PRODUCT

CROSS REFERENCES TO RELATED APPLICATIONS

The present invention contains subject matter related to Japanese Patent Application JP 2005-355250 filed in the Japanese Patent Office on Dec. 8, 2005, the entire contents of which being incorporated herein by reference.

BACKGROUND OF THE INVENTION

1. Field of the Invention

The present invention relates to making of panorama image (referred to also as "panorama") composed of a plurality of images, and more particularly to a camera system for obtaining a panorama image by joining shot images together, a camera control apparatus for controlling a camera, a panorama image making method for making panorama images and a computer program product.

2. Description of the Related Art

To make a panorama image by joining a plurality of images together, there has hitherto been used a method of making a panorama image by joining images shot by a plurality of cameras with the same zoom magnification or a camera with a pan/tilt function of which zoom magnification is fixed together (see Cited Patent Reference 1, for example).

Related-art panorama images will be described with reference to FIGS. 1 and 2. FIG. 1 is a schematic diagram to which reference will be made in explaining panorama image shooting processing according to the related art. Also, FIG. 2 is a schematic diagram showing an example of a completed panorama image according to the related art.

A camera, generally depicted by reference numeral 101 in FIG. 1, is a still camera, for example. The camera 101 shoots a plurality of images constructing a desired panorama image 110 with a fixed zoom magnification. For example, first, the camera 101 is directed to an upper left portion of the panorama image 110 as a shooting start position to shoot an image 111. Next, the camera 101 is moved from the shooting position of the image 111 to the right-hand direction of FIG. 1 by a predetermined pan angle to shoot an image 112. Further, the camera 101 is moved by a predetermined pan angle to shoot an image 113, . . . . Thus, the camera 101 is able to shoot images sequentially. After a last image 111n of the first stage was shot by the camera 101, the shooting position of the camera 101 is set to the left end of the second stage and the camera 101 is able to shoot images 122, 123, . . . . Then, the camera 101 shoots images from an image 111m of the left end of the last stage to an image 111mn of the right end. After shooting of all images required to make the panorama image 111 was finished, the panorama image 110 is made by joining these images.

As shown in FIG. 2, the completed panorama image 110 is composed of a plurality of images with a uniform display size.

[Cited Patent Reference 1] Japanese unexamined patent publication No. 11-18003

SUMMARY OF THE INVENTION

Since a plurality of images constructing the thus made panorama image are shot with a fixed zoom magnification regardless of a distance between the camera and the shooting object, images in a short distance shooting, which do not need high definition, such as an image of a person 115 (in FIG. 2) are shot with the same accuracy as that of the long distance shooting. Therefore, it is customary that data having a data amount greater than a required data amount should be held.

Also, when a camera has a function to enlarge a part of the panorama image, it is necessary to shoot images constructing a panorama image with high definition (high magnification). However, according to the related-art method, since the zoom magnification is fixed, a whole range of a panorama image should be shot with high magnification and the number of images and image data become enormous unavoidably. As a result, problems arise, in which it takes a lot of time to shoot images and display shot images.

Also, in order to solve these problems, it has been proposed to separately manage panorama displaying data and high definition (magnified) data. However, it is inevitable that the number of images and image data which should be held will be increased. Further, there is then a problem that data should be managed in a double management fashion.

In view of the above aspects, the present invention intends to suppress a data amount to a data amount less that a required data amount and to decrease the total number of images constructing a panorama image and image data.

In order to solve the above-described problems, according to an aspect of the present invention, there is provided a camera system including a camera apparatus for shooting an object to output an image signal and a camera control apparatus for controlling said camera apparatus such that the camera apparatus shoots a plurality of images constructing a panorama image in a predetermined order while changing zoom magnifications based on previously-determined setting and making a panorama image by joining a plurality of images with different zoom magnifications shot by the camera apparatus together.

For example, the camera control apparatus includes a shooting list making unit for making a shooting list in which pan angles, tilt angles and the zoom magnifications of the camera apparatus are listed with a correspondence relationship and a control unit for outputting a control signal to control shooting processing of the camera apparatus based on the shooting list, converting sizes of a plurality of images with different zoom magnifications shot by the camera apparatus into sizes suitable for displaying a panorama image in response to respective zoom magnifications and making a panorama image by joining a plurality of converted images together.

According to the above-mentioned arrangement, since the object is shot by the camera apparatus while changing zoom magnifications in response to conditions, only one shooting is sufficient and image data of a data amount greater than necessary data amount need not be shot and held.

Also, according to other aspect of the camera system of the present invention, the shooting list making unit sets a zoom magnification of the shooting list in response to a distance from the camera apparatus to the object, increases the zoom magnification at a portion in which a distance from the camera apparatus to the object is long and decreases the zoom magnification at a portion in which a distance from the camera apparatus to the object is short.

According to the above-described arrangement, the number of the panorama constructing images constructing the panorama image can be decreased and a panorama shooting time and a display time can be reduced. Also, a data amount of the panorama image can be decreased.

Also, according to a further aspect of the camera system of the present invention, the shooting list making unit further divides an image designated from images constructing the panorama image into a plurality of images and sets zoom magnifications of the divided images to high zoom magnifications in response to the number of the divided images.

According to the above-described arrangement, since only a specific portion can be shot with a high magnification (high definition) and other shooting positions are shot with a low magnification, the whole of panorama image need not be shot with high definition. Hence, increase of the total number of panorama images can be suppressed to the increase of the needed number of panorama images with the result that increase of a data amount and increase of a shooting time can be decreased.

According to the present invention, when the panorama image is made, data more than required data amount need not be held and the total number of images constructing the panorama image and image data can be decreased. Also, since double management of data becomes unnecessary, it is possible to free users from cumbersome management work.

DESCRIPTION OF THE PREFERRED EMBODIMENTS

Hereinafter, embodiments of the present invention will be described below with reference to the accompanying drawings.

Figure 3:
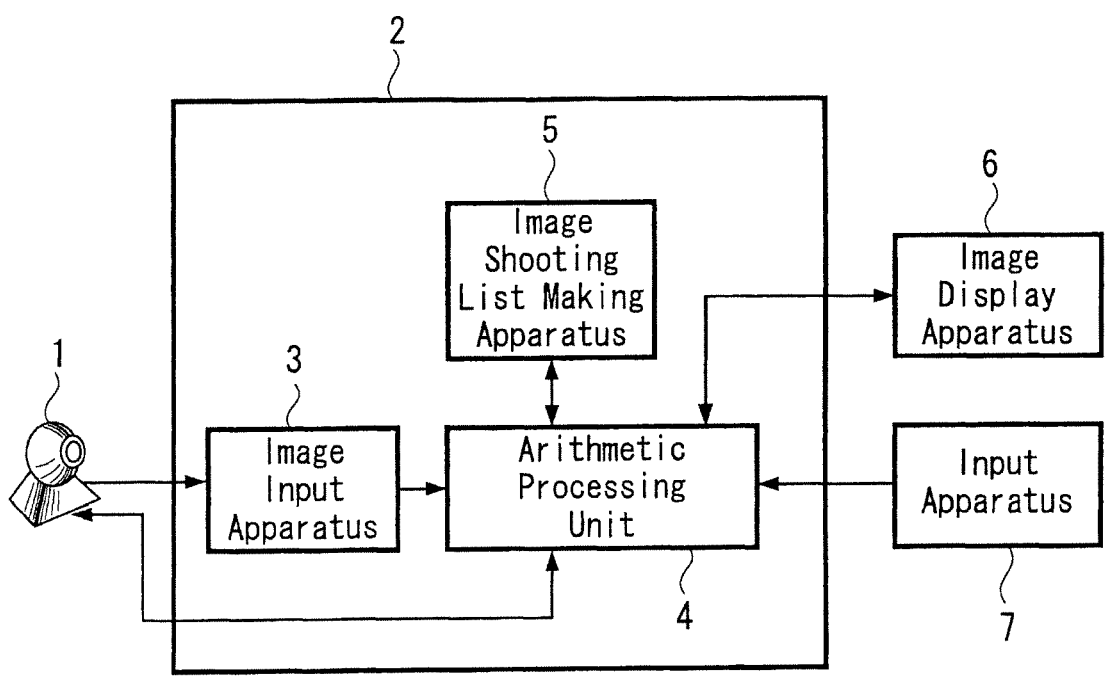
FIG. 3 is a block diagram showing a schematic arrangement of a camera system according to an embodiment of the present invention.

First, it will be explained with respect to a camera system constitution relating to one embodiment of the present invention. FIG. 3 is a block diagram showing a schematic arrangement of a camera system according to an embodiment of the present invention.

As shown in FIG. 3, a camera system according to the embodiment of the present invention is composed of a camera 1 and a camera control apparatus 2. The camera control apparatus 2 is composed of an image input apparatus 3, an image shooting list making apparatus 5 and an arithmetic processing unit 4. Further, an image display apparatus 6 and an input apparatus 7 are connected to the camera control apparatus 2. The camera 1 and the arithmetic processing unit 4 are connected with lines (signal lines) of a control system and a video system so that the arithmetic processing unit 4 is able to control the camera 1. This camera system may be utilized for various purposes such as to monitor the objects 1 to 2 kilometers ahead by shooting the above objects with the camera 1 set to a hill and the like. It is needless to say that purposes may not be limited to the above-described purpose and that this camera system can be used for other various purposes.

It should be noted that "System" in this embodiment may refer to a logical set of a plurality of apparatus (or function modules which can realize specific functions), and it does not matter whether respective apparatus or function modules are incorporated within a single casing or not. For example, it is possible that the camera 1 and the camera control apparatus 2 may be integrally formed as one body. Alternatively, it is possible that the camera 1 may be controlled by the camera control apparatus 2 located at the distant place through a suitable device such as a communication channel.

The camera 1 is an example of a camera apparatus such as a still camera. Although not shown, the camera 1 focuses image light from an object through a lens of a lens block and an iris on an image pickup device such as a CCD (charge-coupled device), converts a visual field picture into a video signal (hereinafter referred to also as an "image signal") and effects signal separation and automatic gain control on this video signal. The camera 1 is able to shoot not only still pictures but also moving pictures.

In the signal separation and automatic gain control processing, the video signal is sampled and held by SH/AGC (sample and hold/automatic gain control) and this video signal is also gain-controlled so as to have a predetermined gain by an auto iris control signal. The thus obtained image signal is converted into a digital signal by an A/D (analog-to-digital) converting apparatus and this digital signal is supplied to the camera control apparatus 2.

Also, the lens block of the camera 1 is a zoom lens which can change a focal length by driving a magnifying lens to change a shooting angle of view, that is, a zoom magnification. Based on a drive command from a camera controller (not shown), the magnifying lens is driven by rotating a zoom motor (not shown) composed of a stepping motor, for example, to change a zoom magnification. This camera controller outputs a drive command to the zoom motor in response to a control signal supplied from the arithmetic processing unit 4 of the camera control apparatus 2.

Also, the camera controller is a controller is able to constantly carry out lens control such as focusing and zooming of the camera 1, exposure control such as iris, gain and electronic shutter speed, white balance control, image quality control and the like. It is possible that this camera controller may be provided either in the camera 1 or the camera control apparatus 2.

Further, the camera 1 is set on an apparatus having freedom in biaxial rotation directions such as pan and tilt, for example, a rotary universal head. Based on a drive command from a pan-tilt controller (not shown), the rotary universal head may be driven in the biaxial direction by rotating a pan motor (not shown) and a tilt motor (not shown), each of which is composed of a stepping motor. In response to drive requests to drive the rotary universal head to pan and tilt directions, this pan-tilt controller is able to output control signals to drives of the respective pan motor and tilt motor such that the rotary universal head may be driven to the requested position Also, this pan-tilt controller is able to constantly transmit the current position of the rotary universal head to the arithmetic processing unit 4. This pan-tilt controller is adapted to output drive commands to the pan motor and the tilt motor in response to control signals supplied from the arithmetic processing unit 4 of the camera control apparatus 2. It is possible that the pan-tilt controller may be provided either in the camera 1 or the camera control apparatus 2.

It should be noted that the arithmetic processing unit 4, which will be described later on, may have functions of the camera controller and the pan-tilt controller.

The image input apparatus 3 of the camera control apparatus 2 receives the image signal from the above-described camera 1, converts the received image signal into signals such as a luminance signal, color difference signals and a video signal and supply these signals to the arithmetic processing unit 4.

The arithmetic processing unit 4 is an example of a control unit and a suitable unit such as an MPU (microprocessor) can be applied to the arithmetic processing unit 4. The arithmetic processing unit 4 may use a RAM (random-access memory) (not shown) as a work area and carries out predetermined calculations and controls in accordance with computer programs recorded on a ROM (read-only memory) (not shown). A computer program that enables the computer (arithmetic processing unit 4) to make panorama images (panoramas) according to the present invention is recorded on this ROM.

This arithmetic processing unit 4 may control the system based on information of the setting states of the rotary universal head and the camera 1 and other information inputted from the outside. Also, the arithmetic processing unit 4 may issue an absolute position drive request to the camera 1 and may transmit commands to the camera controller and the pan-tilt controller such that the rotary universal head and the magnifying lens of the lens block may be driven. On the other hand, the arithmetic processing unit 4 may acquire current position information of the camera 1 transmitted from the camera controller and the pan-tilt controller.

Also, the arithmetic processing unit 4 has a video capture function to display images obtained from the camera 1, to make a panorama image from these images and to display the panorama image on the image display apparatus 6. The video capture function is able to display an image signal inputted from the camera 1 on the image display apparatus 6 as an image with an arbitrary image quality. Alternatively, the video capture function is able to make a panorama image from the image signal inputted from the camera 1 and to display such panorama image on the image display apparatus 6 as a panorama image with an arbitrary image quality. Also, based on a capture signal, an image signal may be converted into an image signal of an arbitrary image quality with an arbitrary image format (for example, bit-map format, still picture of JPEG, moving picture of MPEG format, etc.) and this image signal may be stored in a storage apparatus (not shown) provided within the camera apparatus 2.

The image shooting list making apparatus 5 is adapted to make a shooting list which stipulates a shooting procedure of the camera 1 to make panorama image. Shooting positions at which a user takes a picture by the camera 1, that is, pan angles, tilt angles and zoom magnifications (also referred to as "shooting magnifications") are registered on the shooting list with a correspondence relationship. A shooting list using tilt angles and a shooting list using picture sizes are available as the shooting list. Method of making such shooting lists will be described later on.

The image display apparatus 6 may be formed by application of a suitable display apparatus such as a liquid-crystal display apparatus and this image display apparatus 6 may display panorama images inputted from the arithmetic processing unit 4.

The input apparatus 7 is an input operation device such as a keyboard and a mouse. By using a GUI (graphical user interface) of the image display apparatus 6 connected to the arithmetic processing unit 4 for operating the input apparatus 7, the input apparatus 7 is able to set zoom magnifications required when images constructing a panorama image are shot. Alternatively, the input apparatus 7 may be used to select a specific portion of a panorama image which a user may want to shoot with high definition. Based on inputted operation commands to form a panorama image, respective control data (control signals) transmitted from the arithmetic processing unit 4 to the camera controller and the pan-tilt controller are determined.

Next, panorama (wide visual field) shooting control and panorama image making processing executed under control of the camera control apparatus 2 will be described with reference to a flowchart of FIG. 4.

Figure 4:
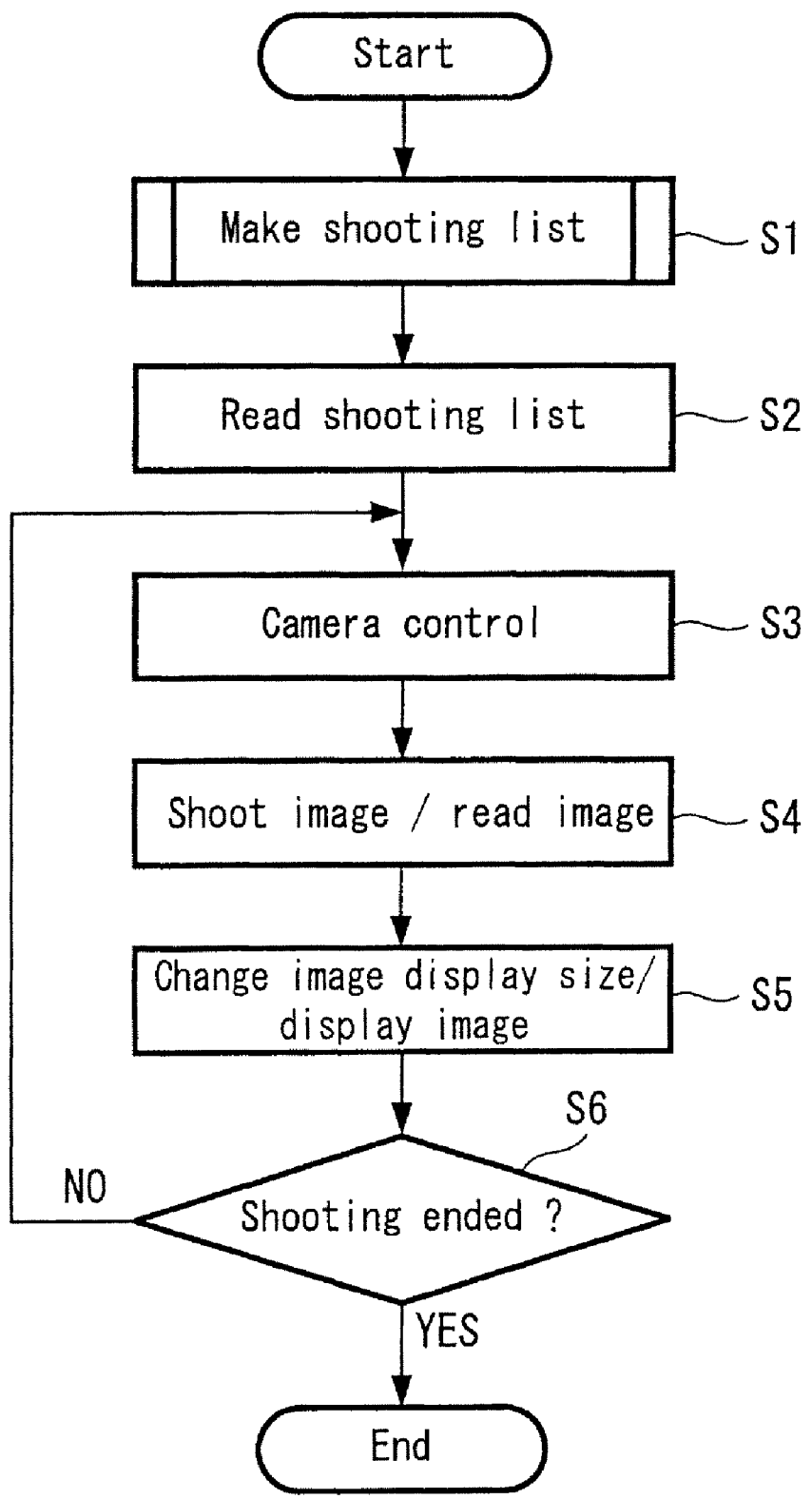
FIG. 4 is a flowchart showing steps of processing executed by a camera control apparatus according to an embodiment of the present invention.

Referring to FIG. 4 and following the start of operation, first, the arithmetic processing unit 4 reads a program from the ROM (not shown) to activate the program. Then, control goes to a step S1, whereat the image shooting list making apparatus 5 makes a shooting list for making panorama images. At this time, the arithmetic processing unit 4 displays menus to make the shooting list on the image display apparatus 6 to urge a user to enter predetermined shooting parameters.

Herein, a method of making a shooting list using tilt angles will be described.

Figure 5:
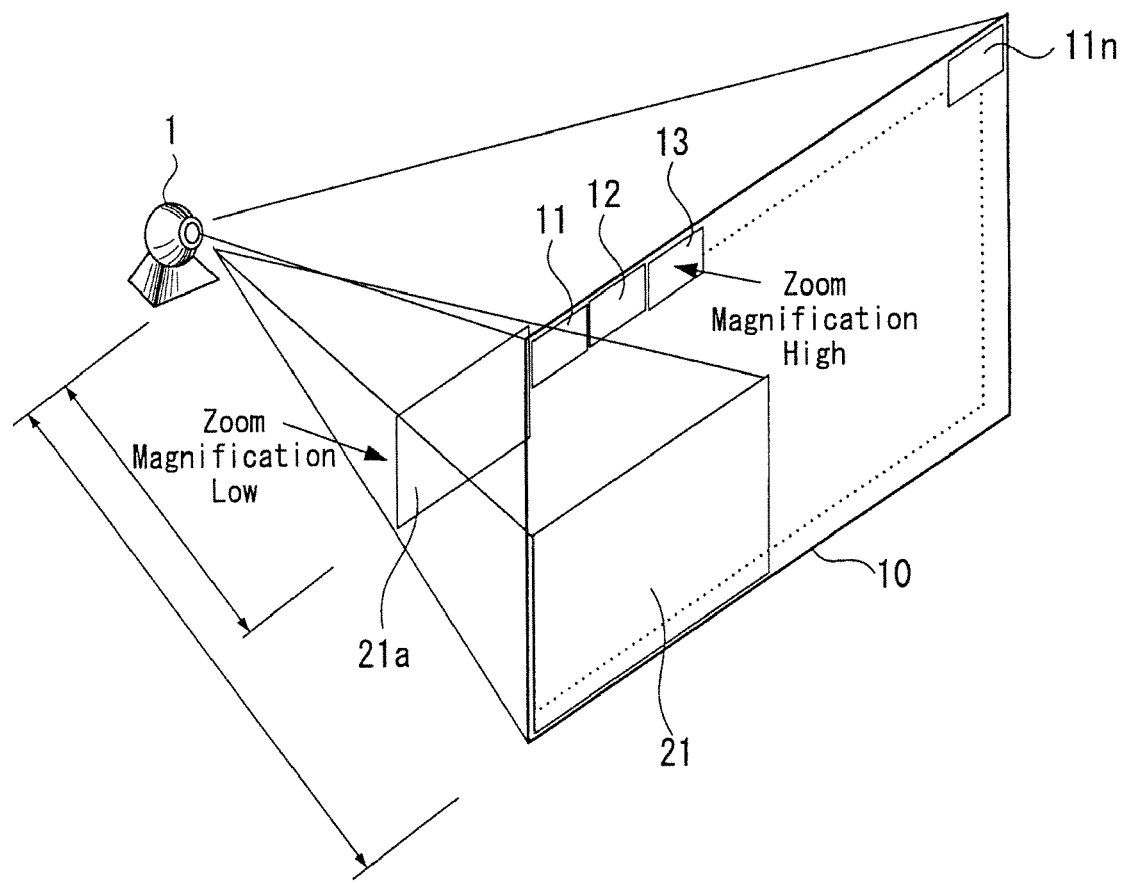
FIG. 5 is a schematic diagram showing shooting processing based on a shooting list using tilt angles according to an embodiment of the present invention.
Figure 6:
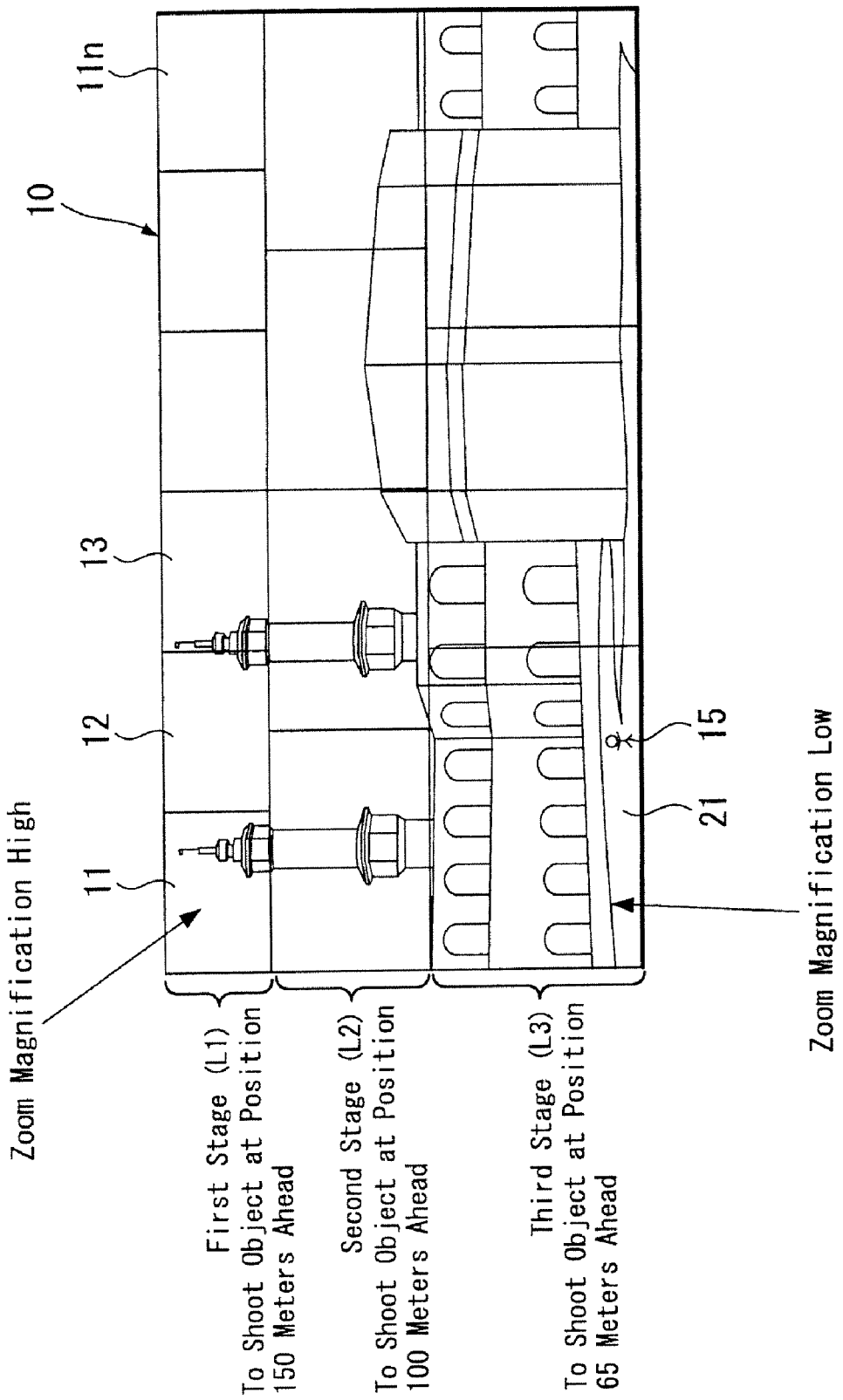
FIG. 6 is a diagram showing an example (1) of a panorama image based on a shooting list using tilt angles.
Figure 7:
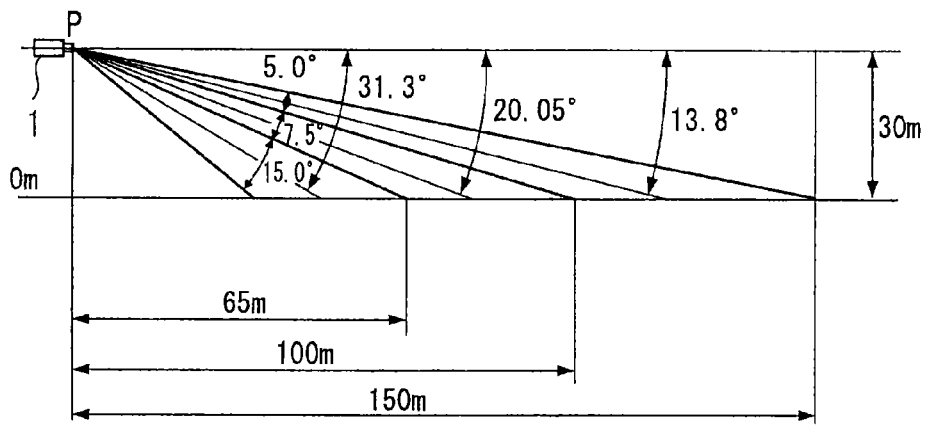
FIG. 7 is a diagram showing a concept of how to change zoom magnifications based on a camera set position and tilt angles.

FIGS. 5, 6 and 7 are schematic diagrams showing the set position of the camera 1 and the change of zoom magnification based on tilt angles. FIG. 5 is a schematic diagram showing shooting processing based on a shooting list using tilt angles. FIG. 6 is a schematic diagram showing an example (1) of a panorama image based on the shooting list using tilt angles. FIG. 6 is a schematic diagram showing the camera set position and a concept of the change of zoom magnifications based on tilt angles.

In the specification of the present invention, a pan angle and a tilt angle are defined as follows. That is, assuming now that a point at which principal light ray at the end of angle of view of the camera 1 is extended to cross the optical axis is a center of a viewpoint, then a pan angle is a movement angle obtained when the optical axis passing the center of the viewpoint is moved from the shooting start position to the horizontal direction or a movement angle obtained when the camera 1 is moved from a certain shooting position to the next shooting position. Also, a tilt angle is a movement angle obtained when the optical axis passing the center of the viewpoint is moved from the horizontal plane.

In this example, as shown in FIG. 7, the camera 1 is set to the position of which height from the ground (0 meter) serving as a reference plane is 30 meters, that is, 30 meters above the ground. Parameters described on the shooting list when shooting is started from the position 150 meters ahead of this camera 1 to the horizontal direction with a zoom magnification of 30 (longitudinal angle of view is 5 degrees) to shoot a panorama image near 40 meters from the camera 1. While the ground is used as the reference plane in this embodiment, it is sufficient that this reference plane may be a plane (position) which becomes the standard to measure the height of the shooting position of the camera 1. Therefore, the reference plane is not limited to the ground and it can be changed freely.

An image of a first stage (L1) of a panorama image can be shot in the following range when the position 150 meters ahead of the camera 1 is shot with a longitudinal angle of view of 5 degrees (zoom magnification of 30)

Height from ground (P): 30 m

Initial camera tilt angle: 13.8 degrees (atan(30 m/150 m)+2.5 degrees (longitudinal angle of view is ½)

Shooting range: 30 m/tan(13.8 degrees−2.5 degrees) to 30 m/tan(13.8 degrees+2.5 degrees)→approximately 150 m to approximately 100 m An image of a second stage (L2) of a panorama image becomes a shooting distance less than 100 m and it can be shot with decreased zoom magnifications.

Zoom magnification: magnifications of 30×100 m/150 m→20 magnifications (longitudinal angle of view is 7.5 degrees)

Camera tilt angle: 13.8 degrees+(5 degrees/2)+(7.5 degrees/2)→20.05 degrees

Shooting range: 30 m/tan(20.05 degrees+3.75 degrees) to 30 m/tan(20.05 degrees+3.75 degrees)→approximately 100 m to approximately 65 m Since an image of the third stage (L3) of the panorama image becomes a shooting distance less than 70 m, it becomes possible to shoot the image with further decreased zoom magnifications.

Zoom magnification: magnifications of 20×65 m/100 m→approximately magnifications of 10 (longitudinal angle of view is 15 degrees)

Camera tilt angle: 20.05 degrees+(7.5 degrees/2)+(15 degrees/2)→31.3 degrees

Shooting range: 30 m/tan(31.3 degrees−7.5 degrees) to 30 m/tan(31.3 degrees+7.5 degrees)→approximately 65 m to approximately 35 m As described above, it becomes possible to shoot images with lower zoom magnifications as the shooting distance between the camera 1 and the shooting object is decreased more. A method of making the shooting list required when this shooting system is in use will be described below. Herein, shooting angles of view determined by the zoom values of the camera 1, tilt angles of the camera 1 and heights above the ground at the set position of the camera 1 and shooting distances of the far side of the shooting range of the camera 1 and shooting distances of the near side of the shooting range at the shooting start position of the camera 1 which are required when an image of n stage (n=2, 3, 4, . . . ) of a panorama image is shot are respectively set as follows:

Shooting angle of view (zoom): $SR_n$

Tilt angle: $TR_n$

Shooting height above ground: P

Shooting distance (far side): $FD_n$

Shooting distance (near side): $ND_n$

First stage (L1):

Determining the height above ground P and the shooting start position at the camera set position and assuming that A and B are shooting angle of view and camera tilt angle, respectively, shooting parameters required to shoot an image of the first stage of the panorama image become as follows:

$SR_1 = A$ $TR_1 = B$ $FD_1 = P/\tan(B - A/2)$ $ND_1 = P/\tan(B + A/2)$

Second stage (L2):

Shooting parameters required to shoot an image of the second stage of the panorama image become as follows:

$SR_2 = SR_1 \times FD_1 / ND_1$ $TR_2 = TR_1 + SR_1/2 + SR_2/2$ $FD_2 = P/\tan(TR_1 - SR_1/2)$ $ND_2 = P/\tan(TR_1 + SR_1/2)$ n stage (Ln):

$SR_n = SR_{n-1} \times FD_{n-1} / ND_{n-1}$ $TR_n = TR_{n-1} + SR_{n-1}/2 + SR_n/2$ $FD_n = P/\tan(TR_{n-1} - SR_{n-1}/2)$ $ND_n = P/\tan(TR_{n-1} + SR_{n-1}/2)$ The image shooting list making apparatus 5 automatically calculates shooting parameters of all images up to the n stages and makes the shooting list after initial values (shooting start parameters) at the shooting start position were determined.

The order in which the camera 1 shoots images in the example of FIG. 6, for example, will be described below. First, having determined the left end portion of the first stage of a panorama image 10 as the shooting start position, the camera 1 shoots an image 11 with zoom magnifications of approximately 30. Next, the camera 1 moves from the shooting position of the image 11 to the right direction by a predetermined pan angle amount (amount of horizontal angle of view in the corresponding zoom magnification) and shoots an image 12 with the same zoom magnifications. Further, the camera 1 moves by a predetermined pan angle amount and shoots an image 13 with the same zoom magnifications, . . . . Thus, the camera 1 shoots images sequentially. After an image 11n at the right end of the first stage was shot by the camera 1, the shooting position of the camera 1 is set to the left end of the second stage, the zoom magnifications are set to magnifications of approximately 20 and an image of the second stage is similarly shot by the camera 1. Then, after an image at the right end of the second stage was shot by the camera 1, the shooting position of the camera 1 was set to the left and of the third stage, zoom magnifications are set to zoom magnifications of approximately 10, images from an image 21 at the left and to an image at the right end are shot by the camera 1. After all panorama constructing images required to make the panorama image 10 were shot by the camera 1, shooting is ended.

It should be noted that the shooting order is not limited to the example of the above-mentioned shooting order, and various shooting orders can be considered in such a manner as to move the camera 1 to the position just under the image at the right end of the first stage (right end of the second stage) after the image at the right end of the first stage, for example, was shot or in such a manner as to make all panorama constructing images by moving the camera 1 to the tilt direction not by moving the camera 1 to the pan direction.

According to the above-described system, as shown in FIG. 6, images with low zoom magnifications may be shot by the camera 1 at the panorama image lower portion which displays a short distance portion of the panorama image and images with high zoom magnifications may be shot by the camera 1 at the panorama image upper portion which displays a long distance portion of the panorama image. According to this method, it is possible to decrease the number of images constructing the panorama image while high-definition images at the long distance portions are being maintained.

Figure 2:
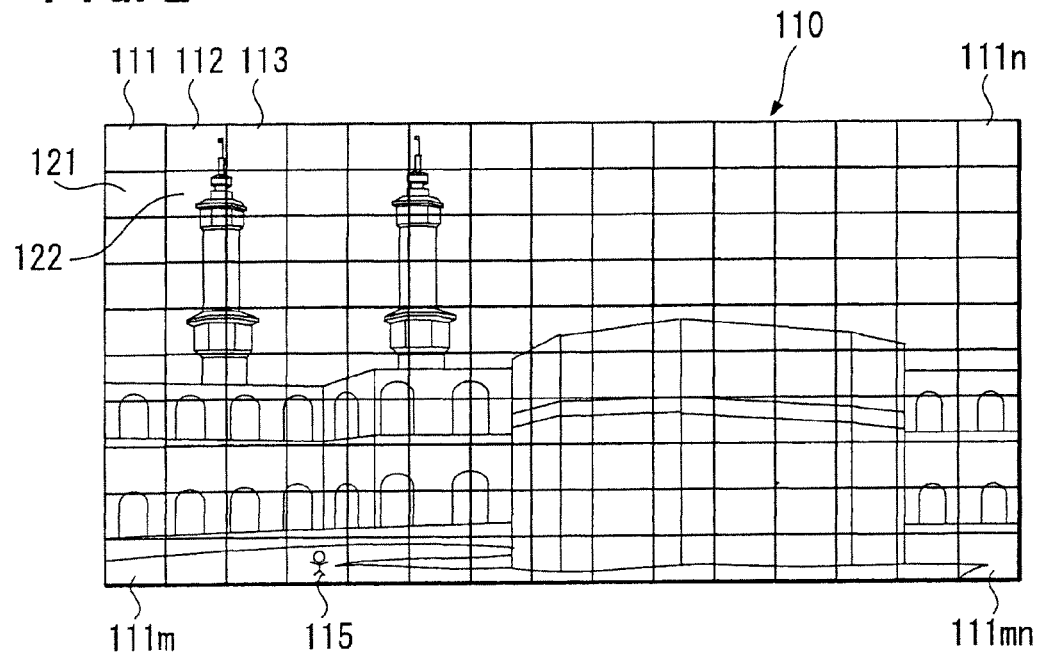
FIG. 2 is a schematic diagram showing an example of a panorama image according to the related art.

For example, since the person 15 (FIG. 6) is shot with lower zoom magnification, the person 15 can be shot with a pixel amount far less than that required to shoot the person 115 in FIG. 2 from a data amount standpoint.

Referring back to the flowchart of FIG. 4, at a step S2, the program on the arithmetic processing unit 4 reads the shooting list that was made by the image shooting list making apparatus 6 as described above.

Then, control goes to a step S3, whereat the arithmetic processing unit 4 sets zoom magnifications, pan angles and tilt angles to the camera 1 in accordance with the shooting list.

Then, control goes to a step S4, whereat the camera 1 moves to the position by amounts of the set pan angle and tilt angle and the camera 1 shoots images for panorama image with the above-described set zoom magnifications at the position in which the camera 1 was move, and the arithmetic processing unit 4 obtains the thus shot images. The thus shot images are managed together with pan/tilt information and zoom magnification information of the camera 1 and which are required when those images are displayed on the image display apparatus 6 as a panorama image.

Then, control goes to a step S5, whereat the arithmetic processing unit 4 changes the thus shot image into the panorama display size and displays (joins) the same at a predetermined panorama image constructing position, and the arithmetic processing unit 4 displays images on the image display apparatus 6 based on the thus shot images for panorama image and information of pan angle, tilt angle and zoom magnification of the camera 1 accompanying with that image. Since images with different zoom magnifications are shot with the same resolution, it is necessary to change display size in response to zoom magnification of the shooting when images are displayed.

Here, it will be explained with respect to a process for changing the picture display size.

Figure 8:
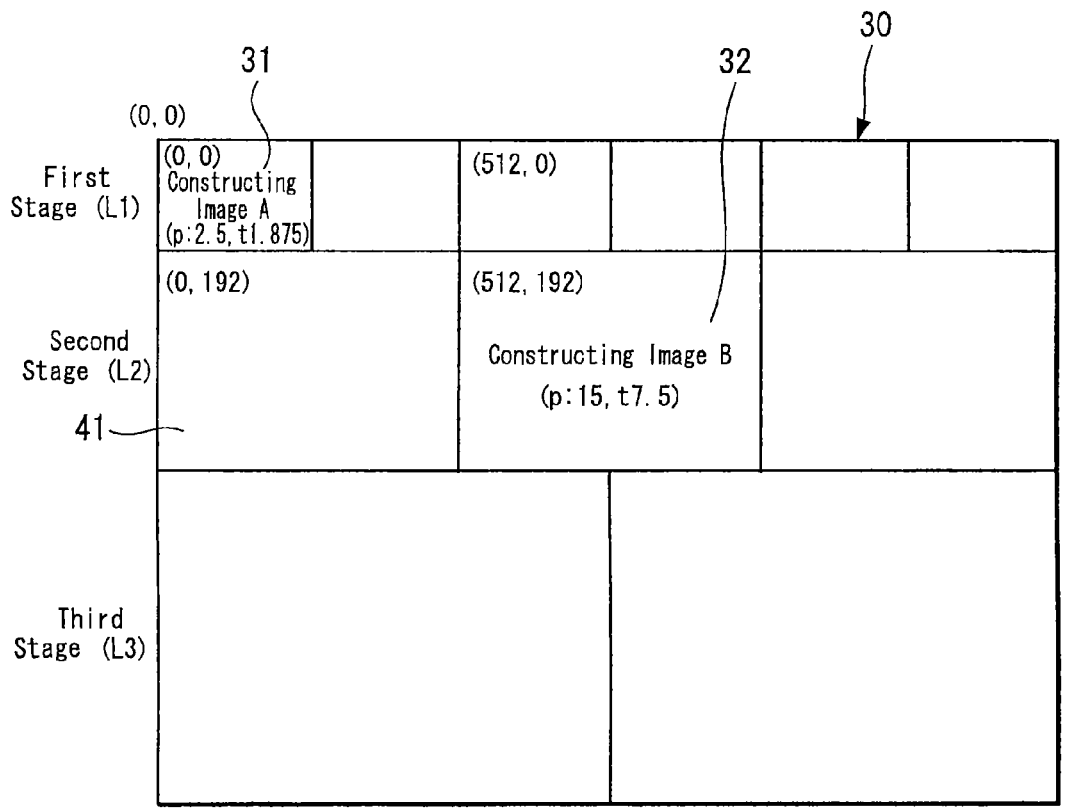
FIG. 8 is a diagram showing an example (2) of a panorama image based on a shooting list using tilt angles.

FIG. 8 is a schematic diagram showing an example (2) of a panorama image based on the shooting list using a tilt angle. Information concerning images (panorama constructing images A and B) constructing a panorama image 30 is as follows:

Panorama constructing image A:
Pan angle: 25 degrees
Tilt angle: 1.875 degrees
Zoom magnification: magnifications of 20 (shooting angle of view width 5 degrees, height 3.75 degrees)
Panorama size (width×height): 1024×768 dots
Panorama constructing image B:
Pan angle: 15 degrees
Tilt angle: 7.5 degrees
Zoom magnification: magnifications of 10 (shooting angle of view width 10 degrees, height 7.5 degrees)
Picture size (width×height): 1024×768 dots In the display position of the panorama constructing image, a predetermined position of the corresponding image, for example, upper left vertex is expressed by X-Y coordinates of the image display apparatus 6. In this example, the upper left vertex of the panorama image 30 is expressed as an origin (0. 0). By way of example, when zoom magnifications of 20 are assumed to be a reference magnification and a size (width× height) 256×192 dots on the image display apparatus 6 is assumed to be a reference display size, display sizes and display positions of a panorama constructing image A displayed at a left end position 31 of the first stage (L1) of the panorama image shown in FIG. 8 and a panorama constructing image B displayed at a second position 32 from the left of the second stage of the panorama constructing image B are as follows:

Panorama constructing image A:
Display size: 256×192 dots, display position (x, y) : (0, 0)
Panorama constructing image B:
Display size: 512×384 dots, display position (x, y) (512, 192)

Then, a display size and a display position of an arbitrary panorama constructing image X are as follows:
When panorama constructing image X have
Reference display size (width, height): (W, H)
Reference magnification: Z (reference angle of view (width, height): (M, N)
Pan angle: p
Tilt angle: t
Shooting magnification: z
Display size (w, h)
Display movement amount (U) per unit pan angle: W/M
Display movement amount (V) per unit tilt angle: H/N, display size and display position are expressed as:
Display size (w, h): (W, H)×Z/z
Display position (x, y): (U×p−w/2, V×t−h/2)

According to the above-described system, it becomes possible to realize making of a panorama image by accurately combining images with different zoom magnifications.

After the change of the image display size and the display processing at the above-described step S5 were ended, control goes to the next decision step S6, whereat it is determined whether whole shooting processing of the shooting list is finished. If the shooting of all panorama constructing images is ended as represented by a YES at the decision step S6, a series of processing is ended.

If the shooting of all panorama constructing images is not yet finished as represented by a NO at the decision step S6, then control goes back to the step S3, whereat camera setting of the next panorama image shooting position are executed. Then, the steps S3 to S5 are repeated until the completion of the panorama shooting.

According to the above-mentioned embodiment, the panorama image which may display a wide range was constructed by using images shot with zoom magnifications which were changed at the long distance portion and the short distance portion. If the images shot with lowered zoom magnifications and wide angles are used in the short distance display portion, it became possible to display the panorama image while the number of the panorama constructing images could be decreased. Since the number of the panorama constructing images constructing the panorama image are decreased, the panorama shooting time and the display time can be reduced and it is possible to decrease the data amount of the panorama image.

Also, in a wide area watching system using panorama image, it becomes possible to carry out wide area watching of which shooting time (panorama shooting interval) is reduced without lowering detection accuracy based on a size of an object to be watched (pixel size per object to be watched). For example, if it is intended to watch a moving object with a high moving speed such as an airplane, then the airplane moves from the end of the shooting area of a panorama image to the other end and there is a possibility that the airplane will not be shot in the panorama image. However, if a shooting time (panorama shooting time) is reduced, then it becomes possible to reliably watch the object to be watched with high moving speed.

Next, a method of shooting only a specific portion of a panorama image will be described as another embodiment of the present invention.

Figure 9:
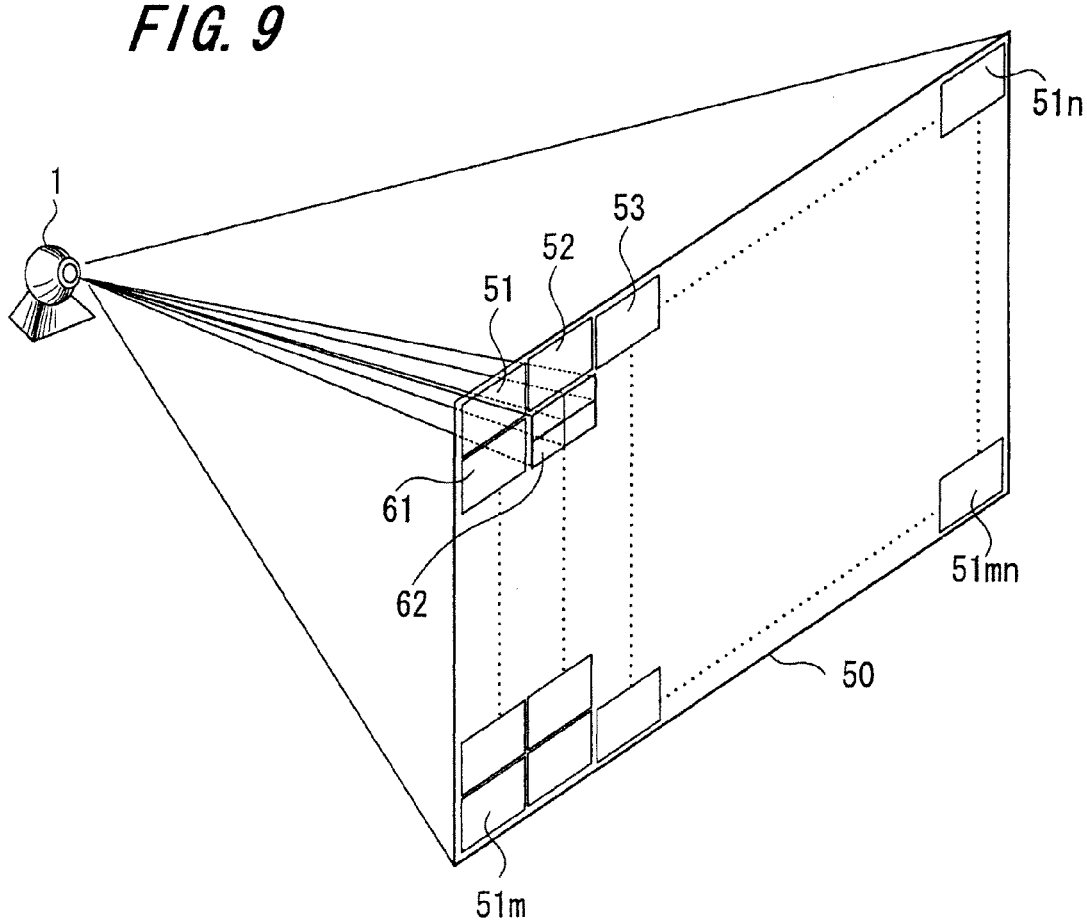
FIG. 9 is a schematic diagram showing shooting processing based on a shooting list using a picture size.
Figure 10:
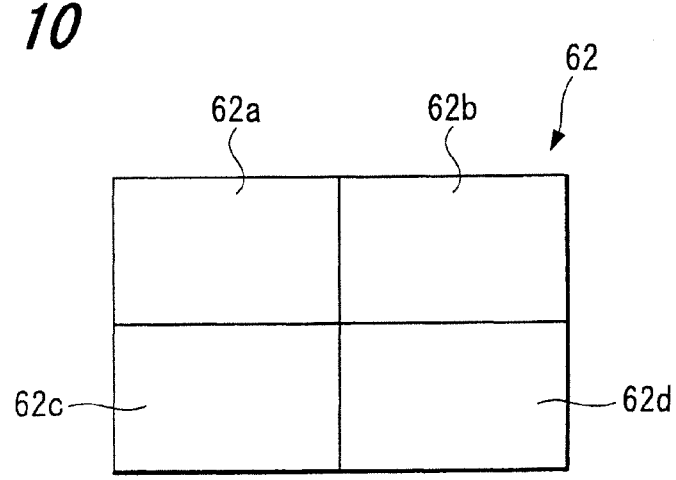
FIG. 10 is a diagram showing main portions of FIG. 9 in an enlarged-scale.
Figure 11:
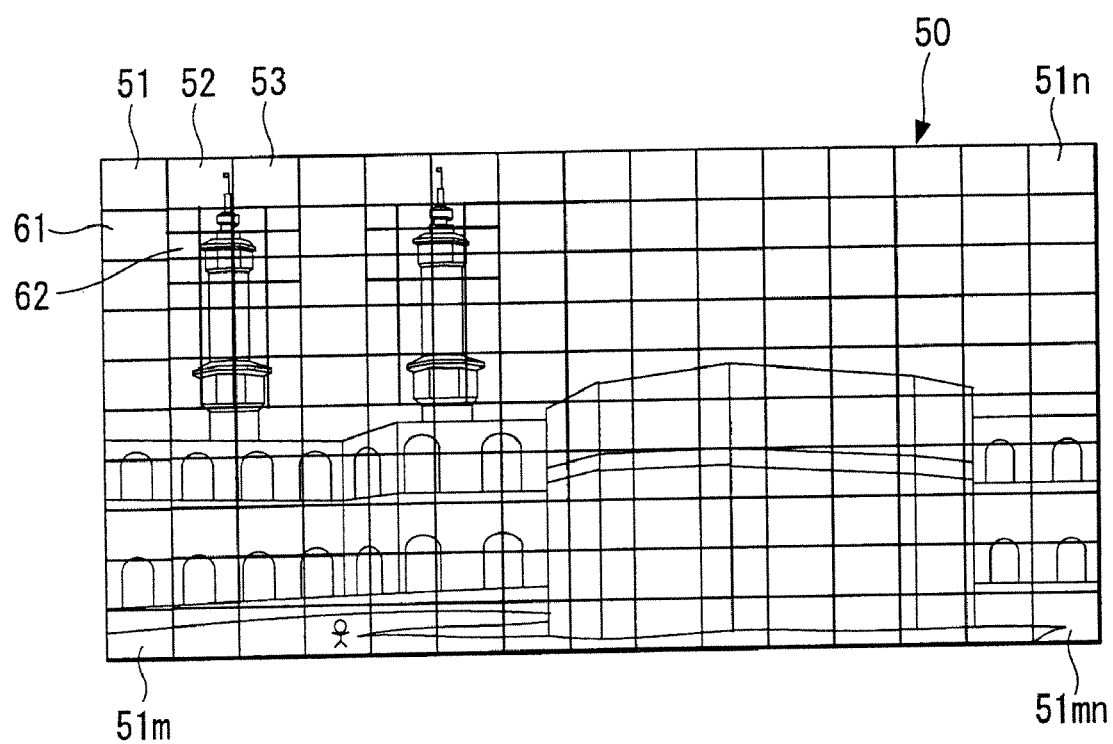
FIG. 11 is a diagram showing a panorama image based on a shooting list using a picture size.

FIGS. 9, 10 and 11 are diagrams to which reference will be made in explaining a method of making a shooting list using a picture size. More specifically, FIG. 9 is a schematic diagram showing shooting processing based on the shooting list that uses the picture size. FIG. 10 is a schematic diagram showing main portions of FIG. 9 in an enlarged-scale. FIG. 11 is a schematic diagram showing an example of a panorama image based on the shooting list using the picture size.

Figure 1:
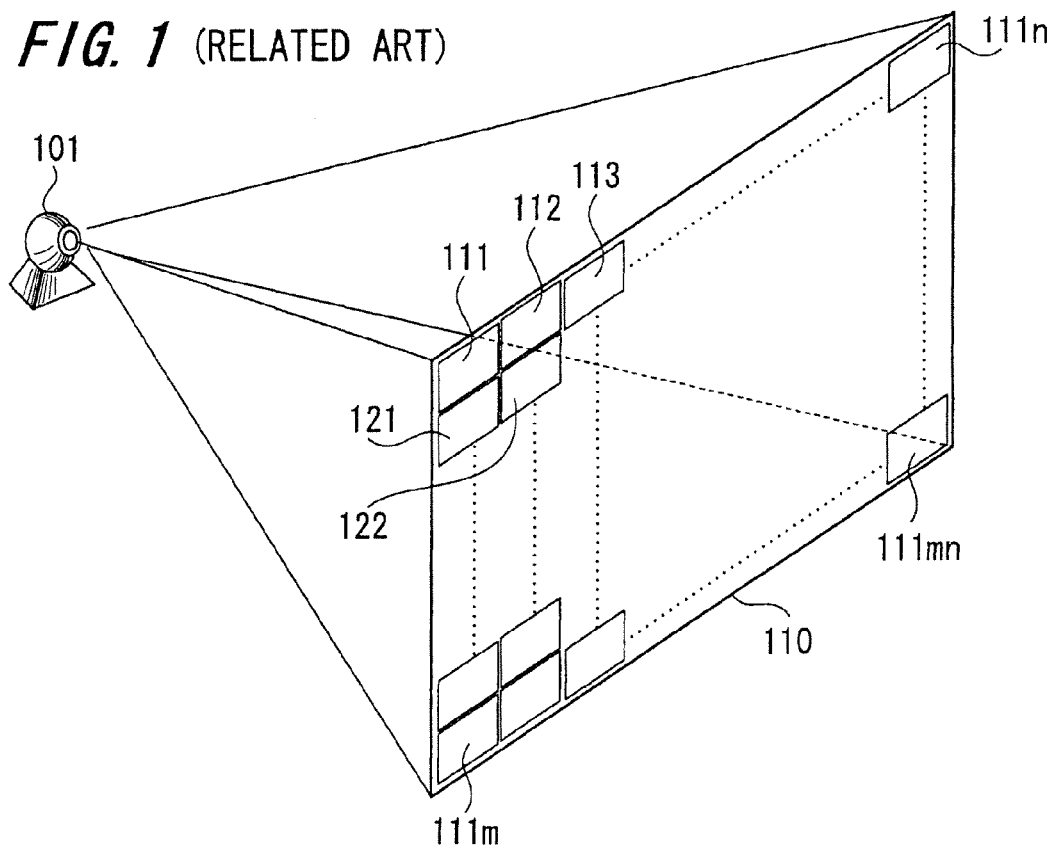
FIG. 1 is a schematic diagram to which reference will be made in explaining panorama image shooting processing according to the related art.

A zoom magnification of a specific portion of a panorama image may be changed when a user specifies a specific portion on the screen and changes a grid size by a shooting list making tool based on the panorama image made by the reference image (reference grid) shown in FIG. 1. When the grid size of the specific portion of the panorama image is changed by the shooting list making tool, the image shooting making apparatus 5 automatically calculates zoom magnifications and makes a shooting list that is used to shoot a panorama image 50 including images of changed grid sizes. Before and after the grid size is changed, a ratio of width and height is fixed.

By way of example, an example in which an image 62 is divided and divided images are shot with high definition while an image 51 (52, 53, . . . 51n, 61, 62, . . . 51m, . . . , 51mn) shown in FIG. 9 is used as a reference image will be described.

FIG. 10 shows the state in which the image 62 is divided into images 62a, 62b, 62c and 62d with smaller grid sizes. Assuming now that the grid size of the reference image is set to 1024×768 (width×height) dots and a zoom magnification is set to magnifications of 5, then grid sizes and zoom magnifications of changed images (images 62a to 62d) become as follows:

Reference image: 1024×768 (width×height)–zoom magnification–magnifications of 5

Changed images: 512×384 (width×height)–zoom magnification–magnifications of 5×(1024/512)→magnifications of 10

As a result of calculations, the zoom magnification of the changed image becomes 10 times as large as the reference image and shooting magnifications of the images 62a to 62d of the image 62 become twice as large as the reference image.

According to the above-described system, it is possible to make the shooting list of the panorama image of which specific portion is composed of images with high definition by changing the grid size of the specific portion on the screen.

After the shooting list based on the above-described picture size was made, a panorama image can be made by similarly executing the steps S2 to S6 shown in FIG. 4. The image display size of the image obtained when only the specific portion with high definition is shot with increased zoom magnifications may be changed and displayed by using the method that has been described so far at the step S5 in the flowchart of FIG. 4.

It is possible for the camera 1 to shoot only the specific portion of high definition with the increased zoom magnification by using the shooting list made by using the above-described system. Hence, it becomes possible to make a panorama image using high definition data of the required portion without increasing image data of unnecessary portions.

More specifically, since only the specific point within the panorama image is shot with high magnification (high definition) and other shooting points are shot with low magnifications, the whole of the panorama image need not be shot with high definition. Hence, the increase of the total number of panorama constructing images can be suppressed to the increase of the number of necessary panorama constructing images and the increases of the data amount and the shooting time can be decreased.

Further, also in the wide area watching system using the panorama image, it is possible to watch a specific portion with high definition by using the above-described method.

As described above, according to the present invention, the panorama shooting time and the panorama display time can be reduced. Also, the data amount of the panorama image can be reduced. Also, in the wide area watching system using the panorama image, it is possible to reduce the shooting time without lowering watching accuracy (object recognition accuracy).

Also, when it is necessary to magnify a specific portion of a panorama image, only the specific portion can be displayed as an image with high definition without managing data doubly. Also, in the wide area watching system using the panorama image, it is possible to watch the specific portion with high definition.

Here, it is needless to say that the present invention can be achieved by supplying a recording medium on which program codes of software that can realize the above-mentioned embodiments are recorded to a system or apparatus so that a computer (or processor such as an MPU and a CPU) of the system or the apparatus may read the program codes from the recording medium.

As the recording medium to supply program codes in this case, it is possible to use suitable storage mediums such as a floppy disk, a hard disk, an optical disc, a magneto-optical disc, a CD-ROM, a CD-R, a magnetic tape, a nonvolatile memory card and a ROM.

Also, not only the functions of the above-mentioned embodiments can be realized by executing the program codes read by the computer but also the functions of the above-mentioned embodiments can be realized by the processing executed when an OS (operating system) operating on the computer executes a part of or whole of actual processing based on instructions of the program codes.

Also, while the still camera has been described as the example of the camera apparatus of the camera system according to the present invention in the above-mentioned embodiments, it is needless to say that the camera apparatus is applied to a video camera such that a panorama image can be made from a plurality of shot moving pictures.

Further, while the optical axis of the camera 1 is directed to the side lower than the horizontal plane in the above-mentioned embodiments, it is needless to say that the present invention is not limited thereto and that the optical axis of the camera 1 may be directed to the side higher than the horizontal plane so that a panorama image may be shot.

Furthermore, the present invention is not limited to the above-mentioned embodiments and that various modifications and changes can be made without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A camera system comprising:
a camera apparatus for shooting an object to output an image signal; and
a camera control apparatus for controlling said camera apparatus such that said camera apparatus shoots a plurality of images in a predetermined order for constructing a panorama image while changing zoom magnifications of at least some of said plurality of images based on a previously-determined setting, and making the panorama image from said plurality of images by joining together the plurality of images with different zoom magnifications shot by said camera apparatus.

2. A camera system according to claim 1, wherein said camera control apparatus includes:
a shooting list making unit for making a shooting list in which pan angles, tilt angles and said zoom magnifications of said camera apparatus are listed with a correspondence relationship; and
a control unit for outputting a control signal to control shooting processing of said camera apparatus based on said shooting list, converting sizes of a plurality of images with different zoom magnifications shot by said camera apparatus into sizes suitable for displaying a panorama image in response to respective zoom magnifications and making a panorama image by joining said plurality of converted images together.

3. A camera system according to claim 2, wherein said shooting list making unit sets a zoom magnification of said shooting list in response to a distance from said camera apparatus to said object, increases said zoom magnification at a portion in which a distance from said camera apparatus to said object is long and decreases said zoom magnification at a portion in which a distance from said camera apparatus to said object is short.

4. A camera system according to claim 3, wherein when said panorama image is composed of n stages (n is natural number greater than 2) and each stage is composed of a plurality of image, if a shooting angle $SR_1$, determined by a zoom value of said camera apparatus at a shooting start position located when an image of a first stage of said panorama image is shot is represented as A, a tilt angle $TR_1$, of said camera apparatus is represented as B, a height from the position in which said camera apparatus is placed on the ground is represented as P, a shooting distance on the far side of a shooting range is represented as $FD_1$, and a shooting distance on the near side of a shooting range is represented as $ND_1$, then shooting parameters at the first stage of said camera apparatus are expressed as:

$SR_1 = A$ $TR_1 = B$ $FD_1 = P/\tan(B - A/2)$ $ND_1 = P/\tan(B + A/2)$ if a shooting angle determined by a zoom value of said camera apparatus at a shooting start position located when an image of n stage of said panorama image is shot is represented as $SR_2$, a tilt angle of said camera apparatus is represented as $TR_2$, a shooting distance on the far side of a shooting range is represented as $FD_n$ and a shooting distance on the near side of a shooting range is represented as $ND_n$, then shooting parameters at the n-th stage of said camera apparatus are expressed as:

$SR_n = SR_{n-1} \times FD_{n-1}/ND_{n-1}$ $TR_n = TR_{n-1} \times SR_{n-1}/2 + SR_n/2$ $FD_n = P/\tan(TR_{n-1} - SR_{n-1}/2)$ $ND_n = P/\tan(TR_{n-1} + SR_{n-1}/2)$.

5. A camera system according to claim 2, wherein said shooting list making unit further divides an image designated from images constructing said panorama image into a plurality of images and sets zoom magnifications of said divided images to high zoom magnifications in response to the number of said divided images.

6. A camera system according to claim 5, wherein said shooting list making unit sets a reference image from images constructing said panorama image, calculates a ratio between said reference image and grid sizes of said divided images and sets zoom magnifications of said divided images by multiplying a reference zoom magnification of said reference image with calculated values.

7. A camera system according to claim 2, wherein said shooting list making unit sets zoom magnifications of said shooting list in response to a distance from said camera apparatus to said object corresponding to each constructing image, increases said zoom magnifications at a portion in which a distance from said camera apparatus to said object corresponding to said constructing image is long, decreases said zoom magnifications at a portion in which a distance from said camera apparatus to said object corresponding to said constructing image is short, further divides a constructing image designated from images constructing said panorama image into a plurality of images and sets zoom magnifications of said divided images in response to the number of divided images.

8. A camera system according to claim 2, wherein when displayed positions of images constructing a panorama image are expressed by two-dimensional coordinates using a specific vertex of said panorama image as its origin, an image in a reference zoom magnification Z is defined as a reference image, a size (width, height) of said reference image is represented as (W, H) and a reference angle of view (width, height) is represented as (M, N), if a pan angle of said camera apparatus at an arbitrary shooting position is represented as p, a tilt angle is represented as t, a shooting magnification is represented as z, a display movement amount U per unit pan angle is represented as W/M and a display movement amount V per unit tilt angle is represented as H/N, then a size (w, h) of converted image is expressed as (W×Z/z, H×Z/z) and a display position (x, y) is expressed as (U×p−w/2, V×t−h/2).

9. A panorama image making method for making a panorama image by joining a plurality of images outputted from a camera apparatus, comprising the steps of controlling the camera apparatus to:
make a shooting list in which pan angles, tilt angles and said zoom magnifications of said camera apparatus are listed with a correspondence relationship;
set pan angles, tilt angles and zoom magnifications of said camera apparatus based on said shooting list;
receive an image with said set pan angle, tilt angle and zoom magnification shot by said camera apparatus;
change said received image into an image of a size suitable for displaying said panorama image; and
sequentially display respective images to make said panorama image.

10. A computer program product for making a panorama image by joining a plurality of images outputted from a camera apparatus together, enabling a computer to realize:
- a function to make a shooting list in which pan angles, tilt angles and said zoom magnifications of said camera apparatus are listed with a correspondence relationship;
- a function to set pan angles, tilt angles and zoom magnifications of said camera apparatus based on said shooting list;
- a function to receive an image with said set pan angle, tilt angle and zoom magnification shot by said camera apparatus;
- a function to change said received image into an image of a size suitable for displaying said panorama image; and
- a function to sequentially display respective images to make said panorama image.

11. A camera controller in a camera apparatus, comprising:
- means for controlling said camera apparatus such that said camera apparatus shoots a plurality of images in a pre-determined order for constructing a panorama image;
- means for changing zoom magnifications of at least some of the images of said plurality of images, based on a previously-determined setting; and
- means for making the panorama image from said plurality of images by joining the plurality of images with different zoom magnifications shot by said camera apparatus.

* * * * *